Patented Oct. 23, 1934

1,977,728

UNITED STATES PATENT OFFICE 1,977,728

COMPOSITION OF MATTER AND PROCESS THEREFOR

Ralph W. E. Leach, Winchester, Mass.

No Drawing. Application June 17, 1932, Serial No. 617,917

14 Claims. (Cl. 18—47.5)

This invention relates to compositions of matter and processes therefor. More especially, it relates to processes for dealing with and for utilizing the spent liquor of the sulphite process for making chemical wood pulp.

Such liquor, produced industrially in very great quantity, has heretofore been the subject of extensive experimentation, but its chemical composition is so baffling and its treatment so expensive that little of value has been found obtainable from it. If it be run to waste in a river, it pollutes the water, kills the fish and constitutes a public nuisance. No way has been developed, so far as I am aware, to convert it to harmless condition on a commercially profitable scale; and the problem of disposing of it is regarded as serious and expensive, both by the public in communities affected by it and by the mills which are responsible for it. The procedure most generally adopted is to evaporate it until its organic material becomes a high percentage of the whole, and to burn the residue.

It is an object of the present invention to provide for the converting of this sinister liquid to useful purposes,—with public relief and with commercial and industrial benefit.

As it comes from the digester, this spent sulphite liquor is of thin and limpid aspect, much like water; but it is acid, due to the use of sulphurous acid as the active constituent of the cooking liquor. It has the sulphonic acid radical ($SO_2OH$) with mineral ingredients (calcium and magnesium) introduced in the original liquor, and has organic derivatives from the ligneous and resinous portions of the original wood. Six to ten per cent of it more or less, is the ligneous and resinous matter. Research has shown that its chemical composition is very complicated, and that it varies somewhat with the kind of wood and of cooking treatment. For the successful practicing of the present invention it is not necessary to know, except in a broad way, either the chemical composition of the sulphite liquor or the reactions with which the invention deals.

The generic invention herein disclosed provides for the producing of a gum in which derivatives of the ligneous and resinous contents of the liquor constitute the essential part. This gum is weak and friable, but, with associated matter, can be converted, as by molding under heat and pressure, into a permanently solid and strong body which may have any desired shape. This ultimate product is capable of being worked by tools, and is of general utility for making articles of all sorts, comparable with wood, hard rubber, glass, metals, and earthy or synthetic moldable compositions.

The said gum is obtainable by either of several procedures which differ somewhat in detail but which have in common that they accomplish a practically complete separating of the solidifiable organic content of the liquor from free moisture. In some cases inorganic matter, derived from the liquid or from materials added during the process, may be physically or chemically entrapped with these organic solids. Therefore the composition of the gum and the kind and quantity of entrapped matter may vary according to the liquor or according to the particular details of the process followed in getting it from the liquor; but these variations may be considered minor. The generic nature of the invention is illustrated by observing that it can be practiced by procedure lying mainly in the domain of physics, as where the characteristic segregation of gum is obtained as a residue from distillation, or by procedure which involves chemical reaction, as where an introduced anhydrous substance combines with the free moisture and both then remain entrapped in the gum, or where an introduced acid reacts so as to precipitate the gum.

In one form of the invention, this liquid is concentrated, preferably by heating and evaporating, to a point where the contained solids constitute some 63% to 67%, more or less, of the whole. The concentrate has the appearance of a sticky, strong-smelling, pitchy plastic. It is liquefiable by heat and can be mixed with ethyl or methyl alcohol, as preferred, or, if desired, with some other liquid which is miscible with water. Being then further heated in a container at a pressure which may be either atmospheric, sub-atmospheric or super-atmospheric, most of the water and the alcohol can be eliminated by evaporation or distillation at a temperature not more, in the usual case, than 200° to 250° F. This eliminating process can conveniently be carried on continuously, the alcohol being recovered in any suitable manner and used over again.

In some cases, it may be found desirable to avoid the steps of mixing with alcohol and further heating, eliminating the free moisture instead by adding substances having an affinity for water. The presence of such substances, particularly if bulky, may be of advantage as a substitute for the filler or binder which might otherwise be added for the molding.

The alcohol or other substance introduced as an aid in eliminating free moisture and serving that purpose by being easily miscible with water or by having an especial affinity for water, is for convenience referred to herein as a hydrophile, or water-loving substance.

In either event, this moisture-eliminating stage of the process may be expedited and made more thorough by mechanical agitation of the fluid mixture; it being understood that with rise of temperature the pitchy concentrate becomes sufficiently liquid for the hydrophile to mix with it readily and thus to find the water which remains, and that in the case of alcohol the mixing of the alcohol and water reduces the temperature at which the water will pass off. Thus this operation can be executed at a temperature so moderate as not to introduce undesired chemical reaction, nor to involve high expense for fuel. The vapors preferably are continuously removed, as by a pump; and when all moisture which goes off readily by this method has passed off, the waterfeed concentrate may be run off into trays or into drums, where it will solidify when it cools. In order to assure thoroughness in removal of moisture the cake thus formed will usually be further dried by being ground to a powder and then exposed to drying air. In powdered form it is in best condition for utilization in molding, but it appears there may be cases where it can be used directly as it comes in liquid form from the still where it has been treated with the hydrophile.

The product thus resulting, whether obtained by eliminating the moisture or by fixing the moisture in combination in solid form, is the parent substance, herein referred to as the gum or wood gum. It comprises the ligneous and resinous matter of the original wood, and such other substances as may be entrapped therewith, physically or chemically. With this gum, by appropriate measures there may be derived an endless variety of useful products, comprising molded articles, and solid bodies in sheet, rod or block form, workable with tools, or in granular form. Products of the nature thus indicated constitute materials which are useful for numerous purposes, as above indicated, in a wide industrial range, from small articles complete in themselves to materials for building.

Another way of segregating the parent gum involves heating and evaporating the sulphite liquor for concentration as before, but stopping this part of the process when the concentration of solids has come to be about 50% of the whole. A substantial quantity of the water has then been removed, but there is left a residue which is sufficiently fluid for the convenient execution of the step which follows; to wit, the precipitation of lignin and related constituents which come from the wood, by addition of commercial sulphuric or other suitable strong acid. When this degree of concentration is reached, whatever derivatives of the sulphurous acid of the original liquor remain are not sufficient to prevent the successful completion of the process of the invention. The adding of sulphuric acid, in the proportion of two pounds more or less for each ten gallons of the concentrate, will throw down a dark brown or black precipitate which includes the ligneous and resinous ingredients that were in the liquor.

This precipitate when separated from the liquid and dried, either in the air or by the application of heat, is another form of the parent wood gum; is capable of becoming plastic or liquid at moderate temperatures; when solidified has a vitreous fracture; and is friable, without much strength. It can be purified by washing in water, the purpose of the washing step being to remove acids which would attack the mold, but this procedure is open to objection because of a tendency of the precipitate to dissolve in water. A preferable way of eliminating the acids has been found to be by heating the precipitate in air to a temperature of about 200° F., thus driving off the acids or decomposing them, or both. After such heating in air, the gum will be found to have "set" to some extent, to be capable of being readily ground to a powder, and to have lost much of its solubility in water. Precipitates which appear to be similar to the sulphuric acid precipitate have been obtained with cresylic and carbolic acid. Wood gum as thus precipitated is similar to the wood gum obtained by concentrating to a pitchy plastic and eliminating moisture, and like the latter can readily be used, after appropriate treatment, in the manufacture of numerous useful articles.

It will be noted that in each of these cases there is a segregation of the desired organic material and an elimination of free moisture; perhaps immediately as in the case of the procedure first described, or perhaps only as a final step, before molding, as in the case of the precipitate which is mixed moist with a substance and later dried. As precipitation by chemical reaction and concentration by driving off undesired matter by heating both result in segregating the material of the desired gum in plastic or solid form, the term "segregate" is used herein to refer generically to these processes.

The parent wood gum thus obtained is a weak, dark, friable, fusible solid. For some purposes it may be feasible to utilize the gum alone, without admixture, by heating it to fluidity and letting it set in a mold, but in general the gum is best used in combination with some intermingled other substance which acts as a binder or filler, of which wood flour and calcium hydrate are examples. The latter procedure has the further advantage that it effectively waterproofs the product, a feature which is sometimes desirable.

For an illustration, the case may be considered where a small article such as a disk, cup or dielectric body is to be molded from the wood gum made by the process of the invention. The wood gum in powdered form is to be thoroughly mixed with wood flour, chosen in the present instance as an illustration of a combined binder and filler. Assuming that there is 30% of the wood gum and 70% of the wood flour, the mixture will be put into a mold and subjected to a temperature of 300° to 566° F. (corresponding to 150 lbs. pressure of the steam used for heating) and a pressure of 2,500 to 3,500 pounds per square inch, in which case the gum will soften, flow and set in the shape of the mold within a minute or two. The molded product can be ejected from the mold and a fresh charge immediately inserted, molded and ejected, without any delay for curing being needed.

The pressure may be greater or less than that above mentioned; but as to the temperature, it appears that there is a critical range and that attempts to mold at lower or higher temperatures are not so successful. At a lower temperature, the flow does not occur sufficiently freely and there is not a satisfactory set even under the high pressure; while at a higher temperature the setting occurs too rapidly, and may become complete before the flow has been sufficient to fill perfectly the ramifications of the mold. If heat and high pressure are used without sufficient content of filling or binding components in the mixture, the liquefied mass is so thin that the high pressure extrudes it from the mold. A lower pressure can be used, or a larger proportion of ingredients other than the gum. There should, therefore, be a proper proportioning of fluidity, attained by temperature, and of pressure, so that the setting of the molded article will occur throughout the body which is being molded.

The ratio of gum to other components in the molding mixture may be determined according to the nature of those components, the results desired, and other conditions. In the case where a molding is to be effected under high pressure with wood flour, an operative ratio is found with the gum ranging from one-half to double the quantity of wood flour. If desired, the finish obtained in the molding may be improved and the tensile strength increased by adding small amounts of cresylic acid and formaldehyde.

Said other components will ordinarily be in finely divided form so that there can be a thorough intermingling with the gum; and preferably are prepared by grinding separately from the gum; especially in the case of hard solids, as calcium hydrate, which may be used for the making of tile. The references herein to the use of finely divided material of course do not preclude the setting of larger bodies in the aggregate which is molded.

It is important to notice that a filler or binder in finely divided form can conveniently be added to and mixed with the pitchy plastic at or about the time the hydrophile is added thereto. The ligneous and resinous matter, which is kept fluid by the temperature of the operation, coats and adheres tenaciously to the added solids, with the result that a uniform mixture of wood gum and filler or binder is obtained which, if allowed to cool while the mechanical mixing is continued, will assume a sort of granular form with the wood gum largely distributed in thin superficial layers coating the introduced solids. From such a thin and infinitely extended gum formation, any alcohol and water remaining can readily escape; and the drying can thus be completed very economically. In the case of precipitated wood gum, the addition of a filler or binder to the moist precipitate represents a parallel manner of treatment.

Obviously the gum can be changed from dry to moist, or from moist to dry, condition, for whatever kind of mixing is desired. The mixing of a fibrous filler with moist gum in a beating engine produces a simultaneous fibre-drawing, fibre-coating and intimate mixing of fibres and gum, so that the final composition, after the molding, has a diminished and reluctant fracture and greater strength. The thick pasty mass produced by the heating engine can be squeezed against a screen, and then may be dried in any suitable manner, becoming a thick, friable mass which when ground or powdered is available for molding.

The product can be colored by dyes, pigments or other materials added either while the gum is in plastic condition or after it has been powdered. An aniline or other dye in liquid form may be introduced into the segregate with the alcohol, if alcohol is to be used, before the water is eliminated, thus getting a better distribution, but can be introduced very successfully at later stages of the process. Pigment or other solid material may be put in with the mixing of gum and filler or binder. In general, it can be said that the coloring material may be introduced at the convenience of the operator at any desired point following the segregation of the ligneous and resinous matter.

A mixture having the high ratio of 70% of wood flour has been found capable of taking the shape of the mold perfectly. The molded product is infusible and substantially free from odor. Despite its high content of wood, it is to a large extent non-hygroscopic; is acid-resistant to a high degree; is slow burning; and is possessed of strong di-electric properties. Also, the article thus molded is found to possess adequate tensile and compressive strength for all ordinary utilities, showing a strong resistance to fracture by blows. When broken, the material is brittle and shows granular fracture. It can be drilled and tapped with screw threads, and is in general workable with machine tools.

The invention may be used in connection with a typical bakelite process. In this case, cresylic acid is used instead of sulphuric in throwing down the precipitate from the liquid remaining after the evaporation to 50% solid content. Formaldehyde is mixed with the precipitated powder before the admixture of the same with the pulp or other binder in the beater. The product resulting from heat and pressure in the mold will then require no other binder as above suggested, because of the formation of a lignin reaction product. The resulting composition has the usual characteristics of bakelite, but is much less expensive by virtue of the large bulk which it contains of this inexpensive derivative of spent sulphite liquor.

In the case of the pitchy plastic obtained by concentrating to 63 to 67%, a higher tensile strength and a superior finish in the ultimate product may be obtained by adding to the wood gum a relatively small quantity, for example, 5%, of what may be called phenolic gum, as by dissolving the phenolic gum in alcohol and adding it with the methyl or ethyl alcohol or other liquid which is being used to aid in the removal of the water. The substance thus referred to as phenolic gum is a hard solid, made by mixing together in the presence of an alkaline condensation agent approximately equal parts of phenol and 40% formaldehyde solution, heating to a moderate temperature, and drying. This phenolic gum is dissolved in alcohol and thoroughly mixed with the pitch, from which the above described gum can then be obtained with the phenolic gum intermingled thoroughly.

Suitable binding, filling and coloring matter, as desired, having been mixed with the composite gum thus obtained, the ultimate molded product is found to have a smoother surface as well as greater strength, due possibly to chemical action between the phenolic gum and the ligneous and resinous constituents of the concentrate, or due to the cohesive effect of the condensation product of the phenol and formaldehyde plus its adhesion to the other ingredients of the mass. If the former suggested condition be found to have occurred, viz, a reaction between the lignin and the phenolic gum, this would be in harmony with the action which is known to occur at times between lignin and certain phenolic compounds and may be regarded as an example of the formation of a chemical binder.

A tested specimen molded disk thus made, containing approximately 70% of wood flour and 30% of sulphite wood gum, something like 5% of the latter being of the phenol gum, showed a better finish as above stated and showed water absorptive properties very small, and less, it may be said by way of illustrative comparison, than the water absorptive properties of a specimen of bakelite having a similar percentage of wood flour.

The invention can also be practiced by adding directly to the pitchy plastic suitable quantities of phenol and formaldehyde. The ingredients should preferably, but not necessarily, be present in the proportion of 6 parts by weight of the concentrate to 1 part by weight of phenol and 1 part by weight of 40% formaldehyde solution. The mixture is then boiled for about fifteen minutes. At the end of that period of time, it will be found that the resulting gum, after having been allowed to solidify, can be ground without further treatment and used directly as an ingredient of a molding composition. It is unnecessary, in this case, to add a separate hydrophile, the water originally present having been driven off or fixed, or both, during the boiling step. The product obtained by molding the resulting mass with a binder is very inexpensive as compared, for example, with molded articles made by the bakelite process.

The generic invention is peculiarly advantageous for use under industrial conditions, in which the concentrate or precipitate can be produced at the remote points where paper mills are located and thence shipped in drums at comparatively low cost for freight. At a central plant, it can be worked further into a powder and prepared for and distributed to a widespread and highly diversified market in form ready for the special purposes of each local user. Large consumers can receive the drums directly and can complete the preparations for further uses, thus perhaps saving freight on the filler which is to be combined with it.

Considering that approximately half of the content of the original wood which is treated by the sulphite process consists of lignin and resin, which, with the original calcium and magnesium components of the liquor, is in the spent liquor which is the raw material of the process herein disclosed, and considering that the annual production is many hundreds of thousands of tons, it is seen that the new material made available for industrial uses by this invention is of very great magnitude. And considering that the ultimate product, the wood gum and the articles which are molded or otherwise made from it, are produced from raw materials of very low cost, and by inexpensive processes, it appears that the product made available by the invention may find industrial uses in a wide range of articles which are now customarily made of all sorts of more expensive materials, and for many purposes beyond the uses to which molded articles have heretofore been put.

It is intended that the patent shall cover, by suitable expression in the appended claims, whatever features of patentable novelty exist in the invention disclosed herewith.

I claim:

1. A process for utilizing spent sulphite liquor including the steps of precipitating from solution the ligneous and resinous constituents of the spent liquor; treating the precipitate, together with any entrapped matter, to eliminate substantially all free moisture therefrom; and thereafter molding the same.

2. A process for recoving ligneous and resinous matter from spent sulphite liquor including the steps of treating the spent liquor to precipitate said matter from solution and treating the precipitate, together with any entrapped matter, to eliminate substantially all free moisture therefrom.

3. A molded article including the ligneous and resinous precipitated matter derived by treating with a strong acid a concentrated sulphite liquor, said matter being set and cohering in permanently solid form.

4. A process for utilizing spent sulphite liquor comprising the steps of segregating ligneous and resinous substances therein by precipitation from solution and thereafter plasticizing the precipitate, forming into desired shape while plastic, and solidifying.

5. A process for utilizing spent sulphite liquor comprising the steps of concentrating the liquor to a relatively thick state; throwing down from solution a precipitate including ligneous and resinous substances therefrom; and thereafter plasticizing the precipitate, forming into desired shape while plastic, and solidifying.

6. A process for utilizing spent sulphite liquor comprising the steps of concentrating the liquor to a relatively thick state; throwing down from solution a precipitate including ligneous and resinous substances therefrom by adding sulphuric acid; and thereafter plasticizing the precipitate, forming into desired shape while plastic, and solidifying.

7. A process for recovering dissolved ligneous and resinous matter from spent sulphite liquor comprising the steps of first concentrating the spent liquor by evaporation; and then precipitating said dissolved ligneous and resinous matter from the concentrated liquor.

8. A process for recovering dissolved ligneous and resinous matter from spent sulphite liquor comprising the steps of concentrating the spent liquor by evaporation; precipitating said dissolved ligneous and resinous matter from the concentrate by the addition of sulphuric acid; and washing the precipitate.

9. A process for utilizing spent sulphite liquor comprising the steps of concentrating the spent liquor by evaporation; precipitating dissolved ligneous and resinous matter from the concentrate; freeing the precipitate of moisture; and thereafter molding the precipitate, under heat and pressure, with a binder.

10. A process for utilizing spent sulphite liquor comprising the steps of concentrating the spent liquor by evaporation; precipitating dissolved ligneous and resinous matter from the concentrate by the addition of sulphuric acid; freeing the precipitate of moisture; and thereafter applying heat and pressure to the precipitate, in finely divided form, with an intermingled finely divided binder.

11. A molded article of manufacture composed of ligneous and resinous matter precipitated from spent sulphite liquor, intermingled with solid particles of other matter.

12. A process for utilizing spent sulphite liquor comprising the steps of evaporating the spent liquor until the content of dissolved solids approximates 50% by weight of the whole; precipitating dissolved ligneous and resinous matter by adding sulphuric acid; evaporating moisture from the precipitate; and thereafter molding the same, under heat and pressure, with an intermingled binder.

13. A molded article which includes the reaction product of waste sulphite liquor and sulphuric acid, said reaction product having intermingled therewith particles of other matter.

14. A molded article which includes, intermingled with solid particles of other matter, the reaction product of sulphuric acid and a sulphite liquor concentrate.

RALPH W. E. LEACH.